United States Patent Office 2,860,762
Patented Nov. 18, 1958

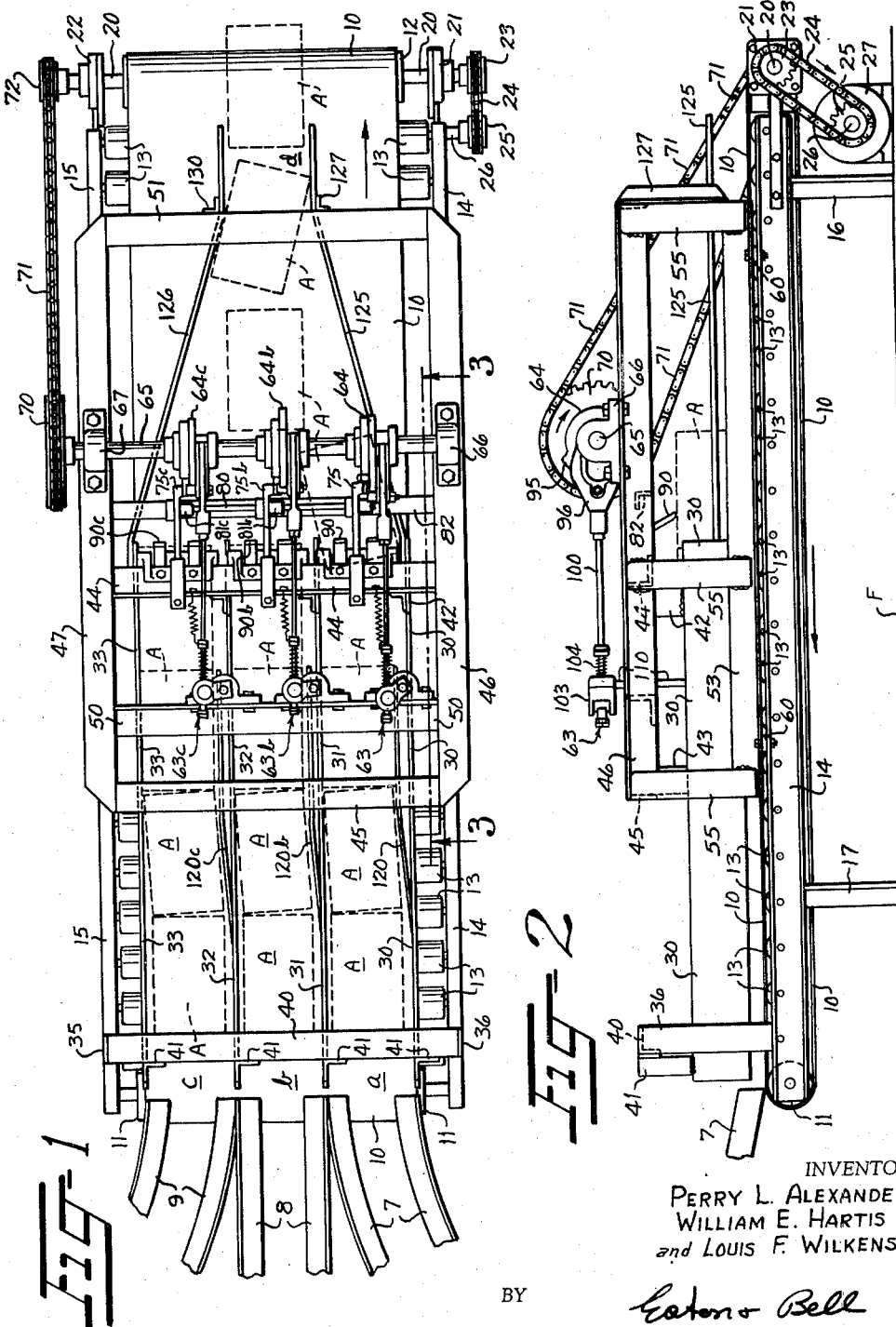

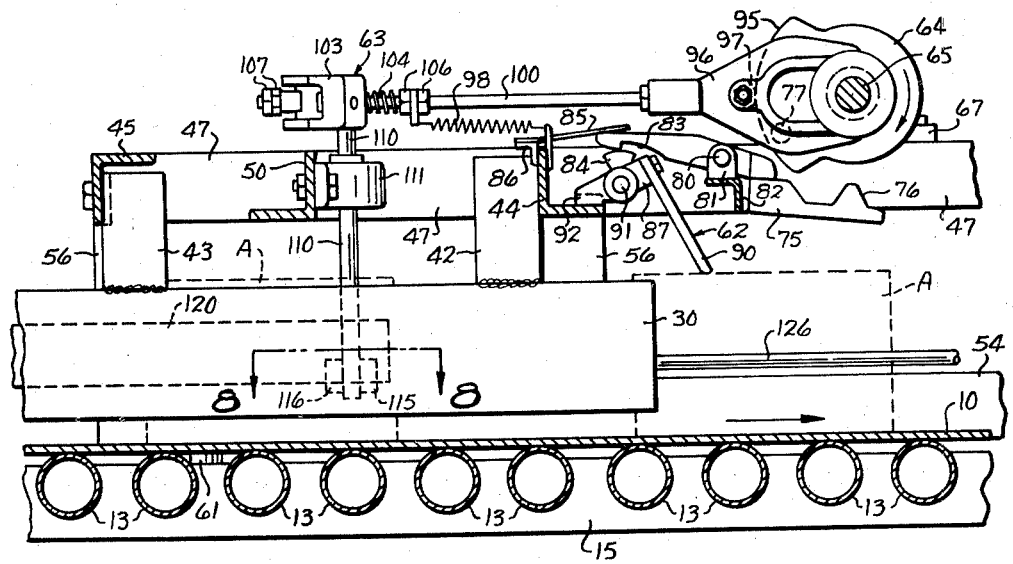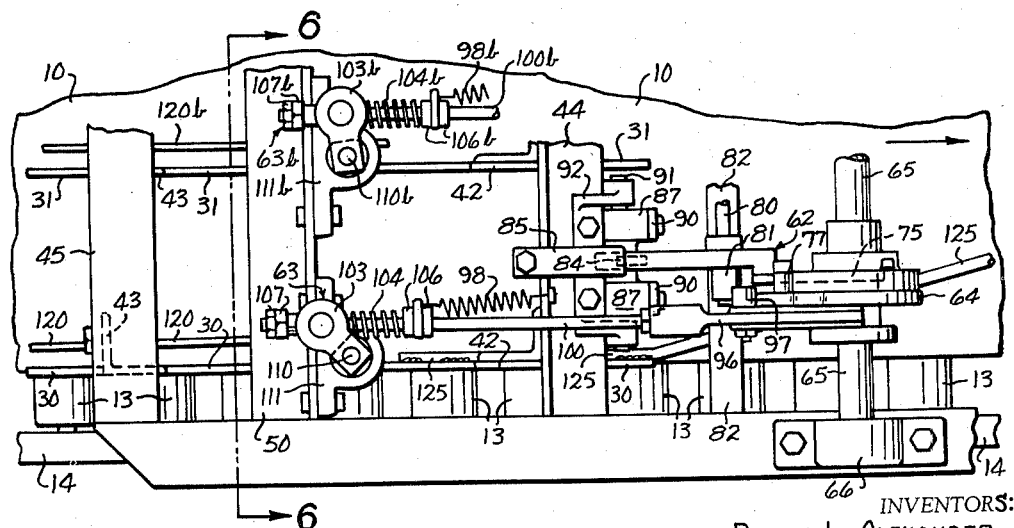

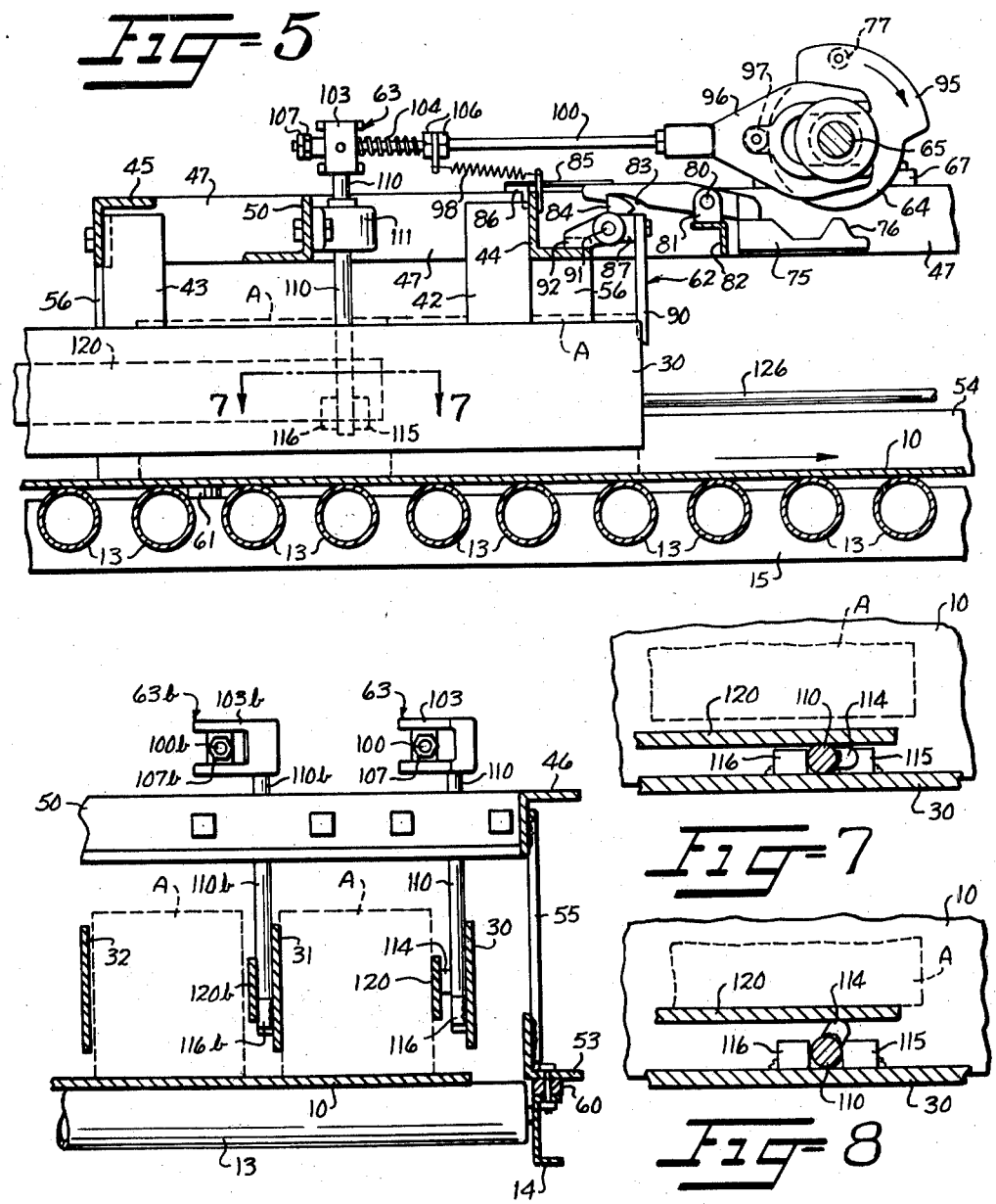

2,860,762

ARTICLE CONVERGER CONVEYOR

Perry L. Alexander, William E. Hartis, and Louis F. Wilkens, Charlotte, N. C., assignors to Dacam Corporation, Charlotte, N. C., a corporation of North Carolina Application April 5, 1954, Serial No. 421,004

1 Claim. (Cl. 198—32)

This invention relates to a conveyor type article converger and more especially to a mechanism for converging a plurality of lines of movable articles into a single line.

It is the primary object of this invention to provide means for converging a plurality of lines of moving articles into a single moving line.

This invention is primarily designed to be used with packaging machinery such as bottle or can packaging machinery and more particularly between the discharge ends of a plurality of cylindrical article packaging machines and a case packer. Such article packaging machines pack a plurality of, normally six, cylindrical objects into a carton and discharge the filled cartons onto conveyors for moving the same to a case packaging machine which will pack a plurality of cartons into a case. This converger could be used with many different types of machinery but, since bottle or can packaging machinery normally operates at a relatively slow speed compared to a case loading machine, this converger is particularly adapted for conveying articles from a plurality of such packaging machines to a single case packer.

It is another object of this invention to provide a converger having a continuous movable belt divided at one end into a plurality of passageways adapted to receive a plurality of lines of moving articles and being provided with means for restraining the movement of some of said articles while permitting continued movement of other of said articles and having means at its other end for channeling said articles into a single continuous line.

It is another object of this invention to provide a machine of the type described having a plurality of passageways at the inlet end thereof and a single discharge passageway at the discharge end thereof and wherein means are provided for stopping the flow of articles from the multiple passageways and automatically, intermittently, permitting one article to move from each passageway in timed relation whereby said articles will be moved into a single continuous line at the discharge end of the machine without jamming.

It is another object of this invention to provide a mechanism of the type described wherein automatic means are provided for holding subsequent articles in a particular passageway when the leading article in said passageway has been allowed to move through the converger.

Some of the objects of the invention having been stated, other objects will appear as the description proceeds, when taken in connection with the accompanying drawings, in which—

Figure 1 is a plan view of the converger showing the discharge ends of a plurality of feeding conveyors which may extend from a plurality of packaging machines to feed articles to the converger-conveyor;

Figure 2 is a side elevation of the article converger shown in Figure 1;

Figure 3 is an enlarged longitudinal vertical sectional view taken substantially along the line 3—3 in Figure 1;

Figure 4 is an enlarged fragmentary plan view of the central lower portion of Figure 1;

Figure 5 is a vertical sectional view through the converger similar to Figure 3 but showing some parts in different positions;

Figure 6 is a fragmentary transverse vertical sectional view taken substantially along the line 6—6 in Figure 4;

Figure 7 is an enlarged fragmentary horizontal sectional view taken substantially along the line 7—7 in Figure 5;

Figure 8 is an enlarged horizontal sectional view taken substantially along the line 8—8 in Figure 3.

Generally, the present invention comprises an endless driven conveyor onto which a plurality of rows of articles, such as rectangular beverage cartons, are placed or fed from respective packaging machines. The conveyor then carries the articles into a converger mechanism including a plurality of laterally spaced guide members spaced closely above the conveyor. Adjacent guide members form passageways therebetween, into each of which a row of articles is fed by the conveyor.

The front ends of the outermost of said guides have the rear ends of forwardly converging secondary guides or walls connected thereto whose front ends are spaced apart a distance slightly greater than that of the width of each article. Means are provided for normally restraining forward movement of the leading two or more articles in each row adjacent the front ends of the first-named guide members and means are provided for momentarily releasing the leading articles in all the rows in predetermined sequence so the conveyor advances the successively released leading article in each row, one at a time.

As each successive article is released from the restraining means, its successor is clampingly restrained from forward movement and the released article is guided to substantially the center of the conveyor by the secondary guides or walls. Thus, the articles in the several rows are formed into a single row as they are advanced by the conveyor beyond the front ends of the secondary guides or converging walls.

Referring more specifically to the drawings, the numeral 10 indicates a relatively wide endless conveyor belt which extends partially around an idler roller 11 and a driving roller 12 and the upper reach of which is supported by a plurality of rollers 13. Opposite ends of the rollers 13 are suitably journaled in roller supporting rails 14 and 15 adjacent opposite sides of the converger. The roller supporting rails 14 and 15 have suitable legs 16 and 17 secured to the lower edge thereof and extending downwardly to the floor F.

The conveyor driving roll 12 is fixed on a shaft 20, opposite end portions of which are journaled in bearing blocks 21 and 22 adjustably secured to the roller supporting rails 14 and 15 (Figures 1 and 2). The end of the shaft 20 adjacent the bearing block 21 has a sprocket wheel 23 fixed thereon and having a sprocket chain 24 passing partially therearound and partially around a sprocket wheel 25 which is fixed on a motor shaft 26 driven by an electrical motor 27. It is thus seen that, as the electrical motor 27 is energized, rotation is imparted to the roller 12 to continuously move the conveyor belt 10 whose upper reach is supported by the rollers 13.

The conveyor belt 10 is provided with a plurality of sections or passageways at its intake or rear end portion and, in this instance, three passageways $a$, $b$ and $c$ are shown defined by a plurality of laterally spaced dividing guide walls 30, 31, 32 and 33. A row of articles A is fed onto the belt 10 into each passageway $a$, $b$ and $c$, from prior processing or packaging machines, by any suitable means such as inclined chutes 7, 8 and 9, respectively.

The rear ends of the dividing guide walls are suitably supported in spaced relation to each other above the conveyor belt 10 by a framework having legs 35 and 36, the lower ends of which are secured to the upper edges of the roller supporting rails 14 and 15 and the upper ends of which are spanned by a horizontal support bar 40 to which a plurality of depending dividing wall support bars 41 are fixedly secured, the lower ends of which are suitably secured to the dividing walls 30, 31, 32 and 33. The front ends of each of the dividing walls are supported in spaced relation to the conveyor belt 10 and in spaced relation to each other by support bars 42 and 43, the lower ends of which are suitably secured to the respective dividing walls and the upper ends of which are fixed to respective transverse angle bars 44 and 45 which span the width of the conveyor 10.

Opposite ends of the angle bars 44 and 45 are secured to a pair of upper side frame members 46 and 47 spaced substantially above the front portions of the respective roller supports 14 and 15. The upper side frame members 46 and 47 are also spanned by transverse frame members or angle bars 50 and 51 (Figure 1). The upper side frame members 46 and 47 are held in spaced relation above a pair of lower side frame members 53 and 54 (Figures 2, 3 and 5) by a plurality of vertical side frame supports 55 and 56, respectively. The lower side frame members 53 and 54 are supported on and in spaced relation to the roller supporting rails 14 and 15 by spacing collars 60 and 61 (Figures 2, 3 and 5).

The passageways a, b and c are adapted to guide three rows of articles A to a restraining and releasing means where they are successively released one at a time in consecutive order to form a single row of moving articles. The restraining and releasing means for each of the rows a, b and c is identical and therefore only the restraining and releasing means for the passageway a will be described in detail. The parts of the restraining and releasing means shown for the other passageways b and c will bear like reference characters with the respective notations "b" and "c" affixed thereto. A primary or front restraining and releasing means is broadly designated at 62 and a secondary or rear restraining and releasing means is broadly designated at 63.

The sets of restraining and releasing means 62 and 63 are activated by respective cam wheels 64, 64b and 64c which are fixedly mounted on a transverse horizontally disposed cam shaft 65 journaled in bearing blocks 66 and 67 fixed on the respective upper side frame members 46 and 47. One end of the cam shaft 65 has a sprocket wheel 70 fixed thereon (Figure 1) which is engaged by a sprocket chain 71 which also engages a smaller sprocket wheel 72 fixed on one end of the shaft 20. It is thus seen that, as rotation is imparted to the shaft 20 in the manner heretofore described, rotation is imparted to the shaft 65 to rotate the cam wheels 64, 64b and 64c associated with the respective passageways a, b and c.

The primary restraining and releasing means 62 includes a lever or dog 75 (Figures 3 and 5) one end of which is provided with a cam surface 76 thereon which is adapted to be intermittently engaged by a protuberance or roller 77 on one side of the cam wheel 64. The levers 75, 75b and 75c are oscillatably mounted intermediate their ends on a common shaft 80 mounted in a bearing block 81. The bearing blocks 81, 81b and 81c are fixed on another transverse frame member or angle bar 82 whose opposite ends are fixed to the upper side frame members 46 and 47.

The end of the lever 75 remote from the cam surface 76 is in the form of a latch having a locking notch 83 therein in which a cam member 84 is, at times, adapted to fit and which is then restrained from counterclockwise movement as shown in Figure 5. The lever 75 is held in engagement with the cam 84 by one end of a corresponding leaf spring member 85 whose other end is fixed on a bracket 86 suitably secured to the transverse bar 44. The hub of cam member 84 has integral therewith a pair of forwardly projecting members 87 (Figure 4) each of which has the upper end of a downwardly projecting gate bar or plate 90 fixed thereto. The cam member 84 with the projections 87 is pivotally mounted on a shaft 91 fixed in a substantially U-shaped bracket 92 fixed on the transverse bar 44.

The lower ends of the gate bars 90 extend downwardly beyond the upper edge of the articles A and are engaged by the upper portion of the front surface of each successive leading article A in the passageway a (Figure 5). Although the endless belt 10 continues to move as each successive article A engages the corresponding bars 90, the bars 90 are normally restrained from counterclockwise movement about the shaft 91 by the latch defined by notch 83 on the rear end of lever 75 until the roller 77 on the cam wheel 64 moves into contact with the cam surface 76 on the front portion of lever 75 to release the cam member 84 and allow the gate bars 90 to be moved in a counterclockwise direction to substantially the position shown in Figure 3 by the corresponding leading article A as it is then advanced, by the belt 10, beyond the passageway a.

The secondary article restraining and releasing means 63, 63b and 63c comprise a raised cam surface 95 on each of the cam wheels 64, 64b and 64c. All the secondary article restraining means 63, 63b and 63c being identical, only the parts associated with means 63 will be described and like reference characters with affixed letters "a" and "b" will apply to means 63b and 63c, respectively, where applicable.

A yoke member 96 is slidably mounted on the shaft 65 adjacent the cam member 64 and is provided with a roller or follower 97 urged against the periphery of the cam wheel 64 and its raised cam surface 95 by a spring 98. The yoke member 96 has a control arm or connecting rod 100 extending rearwardly therefrom which is resiliently held in one end of a rocker or crank arm 103 by a compression spring 104 and lock nuts 106 and 107.

The rocker arm 103 is fixed to the upper end of a vertical rod or shaft 110 rotatably mounted adjacent its upper end in a bearing block 111 fixed to the horizontal bar 50. The vertical rod 110 extends downwardly and has a cam member 114 fixed thereon (Figures 6, 7 and 8). The vertical rod 110 is held in a vertical position during rotational movement by a pair of guide blocks 115 and 116 adjacent opposite sides thereof (Figures 7 and 8). A pair of such blocks 115 and 116 are fixed on one side of each guide wall 30, 31 and 32. With the roller 97 riding on the periphery of the cam wheel 64 and the yoke 96 in the position shown in Figure 5, the lower end of the vertical rod 110 is in the position shown in Figure 7 with an article braking or clamping plate 120 riding thereagainst. The article braking plate 120 has its forward end free and its rear end is suitably secured to the corresponding dividing guide wall 30.

As the cam wheel 64 is rotated from the position shown in Figure 5 to the position shown in Figure 3 the roller 97 and the yoke 96 assume the position shown in Figure 3 to move the vertical rod 110 from the position shown in Figure 7 to the position shown in Figure 8. This moves the cam 114 into contact with the braking plate 120 which then frictionally or clampingly engages the second leading article A passing along the passageway a, thus stopping movement of the articles A in passageway a along the conveyor belt 10, although the belt 10 continues to move and the articles A merely rest upon the conveyor belt 10.

As each successive second leading article A is clamped by the corresponding braking plate 120, the corresponding gate bars 90 are released, in the manner heretofore described, to allow the foremost article A to be released from the passageway a (Figure 3). The high parts 95 of the cam wheels 64, 64b and 64c are set approximately one-hundred-twenty degrees apart relative to each other so the gates 90, 90a and 90b are operated consecutively to successively release one of the articles A from each passageway a, b and c from whence they are guided to form a single row of articles.

As the leading articles A are released from the passageways a, b and c they are directed into a single path or row by a pair of guiding rods or secondary forwardly converging walls 125 and 126 (Figure 1). The guide rod 125 is suitably secured at its rear end to the inner surface of the front end of the primary dividing guide wall 30 and extends forwardly at an angle and is suitably secured adjacent its front end to an angle bar 127 depending from the upper horizontal frame member 51. The guide rod or bar 126 is suitably secured adjacent its rear end to the outer surface of the front end portion of the primary dividing guide wall 33 and extends forwardly at an angle and is suitably secured to the lower end of a depending angle bar or upright frame member 130 whose upper end is fixed to the horizontal frame member 51.

In operation, the articles A are fed from prior processing or packaging machines along the respective inclined chutes 7, 8 and 9 onto the upper reach of the conveyor belt 10 and into the respective passageways a, b and c. Of course, if so desired, the articles A can be manually placed in each of the passageways a, b and c, but the present converging apparatus is particularly designed for forming a single row of articels from a plurality of rows of articles delivered from a plurality of machines. A given number of rows of articles may also be formed into a lesser number of rows with the improved apparatus.

For purposes of description, it shall be assumed that all of the leaf spring clamping or braking plates 120, 120b and 120c are biased inwardly in the respective passageways a, b and c, although the high point 95 of one of the cams 64, 64b or 64c is actually in engagement with the corresponding follower, as shown in Figure 3, when the high points of the other cams are not. Thus, as the leading article A in each row is moved forwardly by the conveyor belt 10, it is initially clamped, and restrained from forward movement by the corresponding leaf spring clamping plate 120, 120b or 120c, as the case may be, against the opposite wall of the corresponding passageway a, b or c.

The cams 64, 64b and 64c then successively release the respective leaf spring clamping members 63, 63b and 63c to permit the conveyor belt 10 to successively advance the leading articles A in the respective passageways a, b and c. The leading articles in passageways a, b and c are then advanced into engagement with the corresponding gates 90, 90a and 90b, in succession, which gates are then maintained in operative or restraining position by the corresponding restraining means as shown in Figure 5.

As heretofore stated, the latch formed by notch 83 in the lever 75 (Figure 5) is normally maintained in engagement with the cam 84 by means of the leaf spring member 85 so that each successive leading article A is restrained from raising the corresponding gates. Considering the restraining and releasing means 62 and 63 associated with the passageway a, for example, after the leading article A in passageway a has engaged the gates 90, the high point of cam 95 moves into engagement with follower 97 to impart counterclockwise movement to the vertical shaft 110, moving the same from the position shown in Figure 7 to substantially the position shown in Figure 8, to thereby clamp the leaf spring clamping plate 120 of the secondary restraining and releasing means 63 against the outer surface of the second leading article A and to, in turn, clamp the opposite surface of the second leading article A against the wall 31.

After the leaf spring clamping plate 120 has been moved inwardly in the manner last described, the follower 77 then moves into engagement with the projection 76 on the lever 75 to thus impart clockwise movement thereto and to raise the latch defined by the notch 83 out of engagement with the cam 84. It is apparent that the forward movement of the upper reach of the conveyor belt 10 will then cause the leading article A in the row in passageway a to be advanced in engagement therewith as the second leading article and the remaining articles in the row are restrained from forward movement by the secondary restraining and releasing means 63.

As the leading article A from the row in passageway a is further advanced by the conveyor belt 10, it slides in engagement with the forwardly and inwardly directed wall or rod 125 to thus substantially aline the last-named article A with the center of the conveyor belt 10. The speed of the conveyor belt relative to the cam shaft 65 is such that the leading article in the row a will move substantially beyond the gates 90 before the high point 95 of the cam 64 again moves out of engagement with the follower 97 to release a second leading article from the secondary restraining and releasing means 63 in the manner heretofore described.

Also, the relative positions of the cams 64, 64b and 64c on the shaft 65 are such that the leading article A in passageway a will have moved substantially beyond the vertical plane of the gates 90 before the gates 90a are released in the same manner as that described with respect to the gates 90 (Figure 3).

The leading end of the leading article A in the passageway b will have also moved forwardly substantially beyond the vertical plane of the gates 90b before the gates 90c are released and the leading article in the passageway c will have moved substantially beyond the gates 90c before the gates 90 in the passageway a are again released.

It is apparent that, as each successive leading article A moves beyond the gates 90, the gates 90 then swing downwardly from substantially the position shown in Figure 3 to that shown in Figure 5, by gravity, so the notch 83 in the lever 95 again engages the cam 84 preparatory to a repeat operation. Since the leading articles in the passageways a, b and c are released in succession in predetermined timed relationship, it follows that the articles will be successively directed inwardly by the converging rods 125 and 126 and will be spaced longitudinally sufficiently from each other to prevent the articles from engaging each other before they successively pass between the front ends of the walls or rods 125 and 126 defining passageway d.

It is thus seen that we have provided apparatus for receiving and conveying a plurality or rows of articles in side by side relationship to a predetermined area and then successively releasing the leading articles from the rows in predetermined timed relationship and, thereafter, converging the articles to form a single row or a lesser number of rows of articles therefrom.

Although three passageways a, b and c are shown for respectively accommodating three rows of articles with means for forming a single row of articles from the three rows, it is to be distinctly understood that any desired number of passageways may be provided on the conveyor belt, the number of rows of articles only being limited by the width of the conveyor belt and the size of the articles. Of course, if a greater or lesser number of rows of articles are to be processed into a single row or a lesser number of rows of articles as compared to the number of rows of articles shown in Figure 1, it is apparent that the ratio of the speed of the conveyor belt 10 relative to the speed of the cam shaft and the dwell of the high point on the cams would necessarily have to be varied accordingly.

There are many purposes for which the improved article converging apparatus may be used and it has been found particularly applicable for receiving a plurality of rows of cartons containing beverage containers or other containers, wherein the cartons in each row are filled with containers on a separate machine, and for subsequently forming the rows of cartons into a single row of cartons preparatory to feeding the single row of cartons to a subsequent case packing machine for positioning a plurality of such cartons in boxes or cases preparatory to shipping. This obviates the necessity of providing a separate boxing or case packing apparatus for each of a plurality of carton filling machines, thus considerably reducing the cost of boxing cartons after they have been loaded or filled on a plurality of beverage cartoning machines.

In the drawings and specification there has been set forth a preferred embodiment of the invention and, although specific terms are employed, they are used in a generic and descriptive sense only and not for purposes of limitation, the scope of the invention being defined in the claim.

We claim:

Apparatus for forming a plurality of rows of moving articles into a single row of moving articles comprising a plurality of laterally spaced primary side wall members defining passageways for receiving said plurality of rows of articles, conveyor means upon which said articles rest and for advancing said articles along said passageways, said conveyor means extending beyond the front ends of said primary wall members, a cam shaft driven in timed relation to said conveyor means and having a plurality of cams fixed thereon, one for each of said passageways, an inwardly biased clamping member adjacent the discharge end of each passageway and disposed adjacent at least one of the wall members defining each passageway, means successively controlled by said cams for actuating said clamping member comprising a vertically positioned rod extending between one of said side wall members and said clamping member, a cam connected to the lower end of said rod whereby upon said rod being rotated by one of said plurality of cams the cam on the lower end of the rod engages the clamping member for clampingly engaging the side surface of the leading article in each row in each passageway for restraining forward movement of the corresponding rows of articles, gate means spaced forwardly from the clamping means and normally being disposed in the path of travel of the row of articles in each passageway, means under control of said cams for normally maintaining said gate means in operative position whereby each successive leading article in each row is restrained from forward movement as it engages the corresponding gate means, and said cams being so arranged as to open the corresponding gate means while actuating the corresponding clamping means to thereby permit the leading article in each row to be advanced by the conveyor means as the second leading article in each row is restrained from forward movement by the conveyor means, and a pair of converging side wall members having their rear ends connected to the outermost of the primary side wall members and having their front ends spaced from each other whereby the converging side wall members cause the successive articles to be converged into a single row.

References Cited in the file of this patent

UNITED STATES PATENTS

| | | |
|---|---|---|
| 1,158,088 | Ward | Oct. 26, 1915 |
| 1,800,898 | Nelsen | Apr. 14, 1931 |
| 1,904,613 | Braren | Apr. 18, 1933 |
| 1,980,411 | Kimball | Nov. 13, 1934 |
| 2,641,371 | Webster | June 9, 1953 |
| 2,675,119 | Birch | Apr. 13, 1954 |
| 2,744,611 | Jenney | May 8, 1956 |

FOREIGN PATENTS

| | | |
|---|---|---|
| 245,273 | Great Britain | Jan. 7, 1926 |